June 15, 1948.  E. L. MAYO ET AL  2,443,472
REFRIGERATOR TRACTOR
Filed May 23, 1946  3 Sheets-Sheet 1
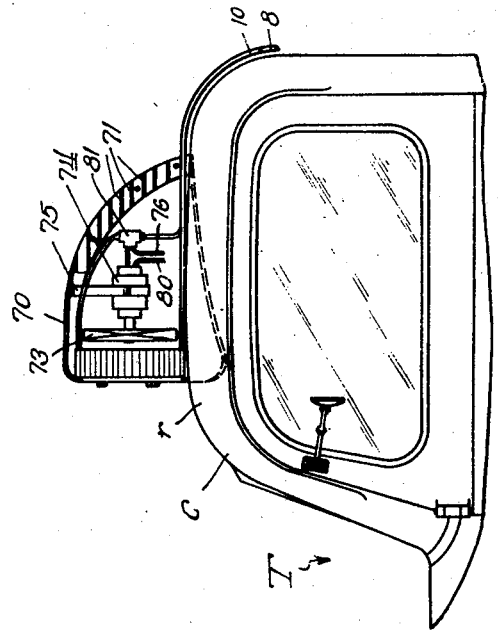
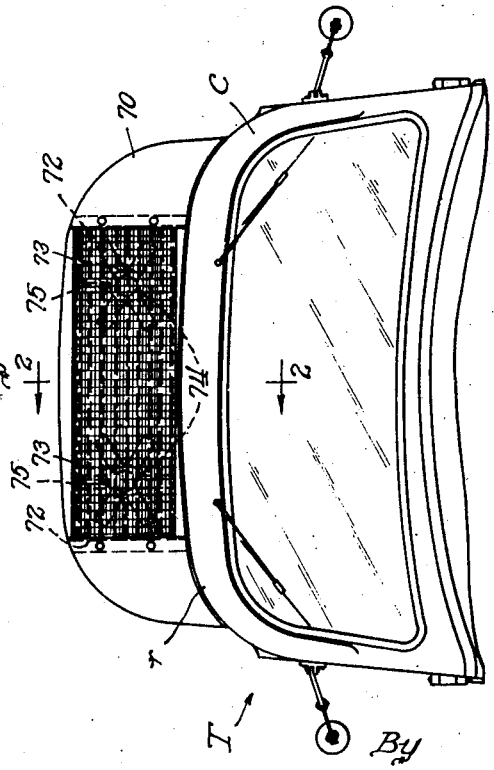
Inventors:
Edward L. Mayo,
Arnsted A. Getz.
By Brown, Jackson, Boettcher & Dienner
Attys.

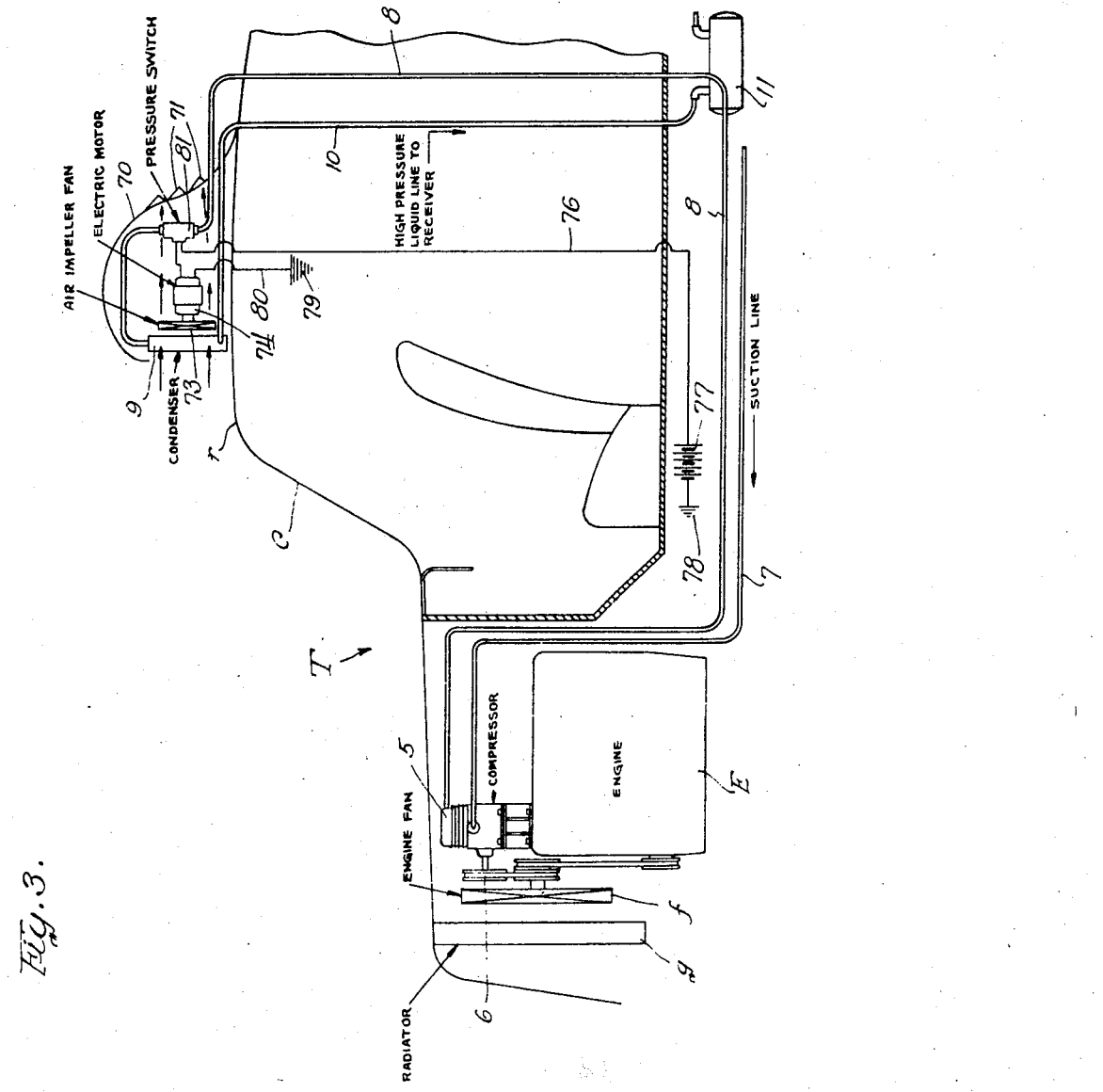

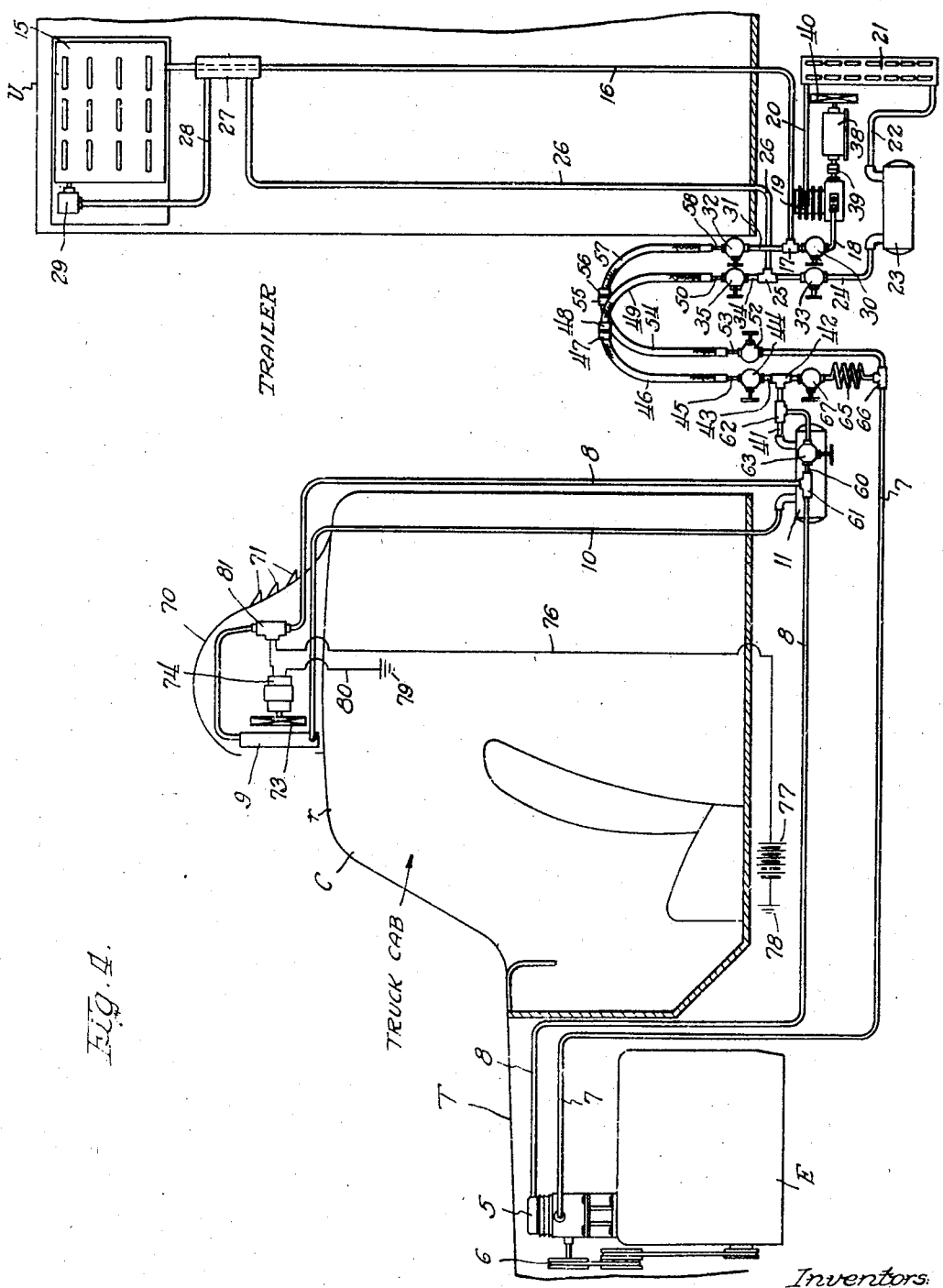

Patented June 15, 1948

2,443,472

UNITED STATES PATENT OFFICE 2,443,472

REFRIGERATOR TRACTOR

Edward L. Mayo, Cleveland, and Arnsted G. Getz, Lakewood, Ohio, assignors to The Bishop & Babcock Manufacturing Company, Cleveland, Ohio, a corporation of Ohio Application May 23, 1946, Serial No. 671,866

15 Claims. (Cl. 62—117)

This invention relates to tractors, and has to do with tractors for transporting units, such as trailer trucks or truck bodies, equipped with mechanical refrigeration systems.

Perishable goods of various sorts, requiring refrigeration, are transported in large quantities by truck and truck trailers, the latter attached to tractors, as is well known. The body of the truck, or the truck trailer, as the case may be, constitutes a unit equipped with a mechanical refrigeration system. In transit, the refrigeration system may be operated by power derived from the power plant of the truck or tractor, or, in some cases, by its own power plant. It is imperative, for obvious reasons, that the interior of the unit be maintained at the proper temperature to prevent deterioration of the goods therein, both during transit and when the unit is stationary, as during a stop in transit or at the destination to which the shipment of goods is consigned. To that end, the refrigeration system, particularly if it derives its power in transit from the power plant of the truck or tractor, may be provided with an electric motor which, during a stop, is connected to a suitable source of electrical energy available at the station or depot at which the stop is made. In addition to assuring continued operation, it is of importance, for practical considerations, that means be provided for rapidly cooling the refrigerant as it is compressed preliminary to its return to the evaporator or cooling element of the system, to the end of efficient and low cost operation.

Our invention is directed to a referigerator tractor, for transporting a trailer or a truck body equipped with a refrigeration system, having means whereby assurance is had that the proper degree of refrigeration will be maintained during transit and at comparatively low cost.

More specifically, we provide a tractor having means, supplementary to the refrigeration system of the associated unit, comprising a compressor driven by the tractor power plant and a condenser, there preferably also being a receiver carried by the tractor, to which receiver the compressed and condensed refrigerant is delivered from the condenser. During travel of the tractor and its associated unit, the compressor, condenser and receiver of the tractor are appropriately connected to the refrigeration system of the unit, with the compressor, condenser and receiver of the unit cut out of that system. The tractor carried condenser is disposed for free flow thereover of the air stream incident to travel of the tractor. In the normal travel of the tractor the resultant air stream adequately cools the compressed refrigerant delivered to the condenser by the compressor, thereby assuring efficient and low cost operation of the refrigeration system, including the tractor carried parts. It is necessary at times for the tractor, with its associated unit, to travel at reduced speed or even to stop briefly, as when ascending steep hills or when driving in slow traffic or in cities. At such times the air stream flowing over the condenser is greatly reduced or may cease entirely. In order to take care of such conditions, we provide means operated independently of the travel of the tractor whereby cooling air in adequate amount is caused to flow over the condenser responsive to increase in pressure of the refrigerant delivered by the compressor to the condenser. More specifically, we provide electrically driven air impeller means—such as fan means—energized by a storage battery carried by the tractor and charged as required by a generator driven by the tractor power plant, in a known manner. Operation of the air impeller means is controlled responsive to the pressure of the refrigerant delivered by the compressor to the condenser, conveniently by means of a pressure responsive switch which closes at a predetermined high pressure and opens at a predetermined low pressure, this switch being subject to the pressure of the refrigerant delivered from the tractor carried compressor to the tractor carried condenser. It is of importance that the condenser be maintained in such condition as to assure free flow of cooling air therethrough, and we therefore dispose the condenser in such a position that it will not be objectionably exposed to road dust and mud. To that end, the condenser is mounted on the roof of the tractor, preferably on the roof of the tractor cab, and is enclosed by a hood open at its front and its back for free flow of air therethrough. The air impeller means or fans are preferably disposed within the hood adjacent the condenser and serve, when in operation, to cause flow of air through the condenser in the same direction as the air stream incident to travel of the tractor, thereby augmenting the air stream when the tractor is traveling at reduced speed and the fans are brought into operation. Further objects and advantages of our invention will appear from the detailed description.

In the drawings:

Figure 1 is a fragmentary front view of a refrigerator tractor embodying our invention, showing the hood and the condenser therein and associated parts mounted on the cab roof;

Figure 2 is a sectional view taken substantially on line 2—2 of Figure 1, the tractor cab being shown in elevation;

Figure 3 is a semi-diagrammatic view, partly in section, of the tractor and the parts carried thereby; and Figure 4 is a diagrammatic view of the tractor and the trailer transported thereby, showing the piping arrangement of the two whereby the desired connections may be effected.

In the accompanying drawings we have shown our invention as embodied in a tractor for transporting a trailer, by way of example, it being understood that our invention may be applied also to a truck having a body provided with a refrigeration system. In the latter case, that is, in the case of a truck, the truck body constitutes a unit provided with a refrigeration system and the remainder of the truck, comprising the wheel mounted chassis, the power plant and the steering mechanism and associated parts, constitute means or a tractor for transporting the body unit. Accordingly, the term "tractor" is used herein as including both a tractor for attachment to a trailer to be transported thereby and a truck including a body, each equipped with a refrigeration system, and is to be construed accordingly.

In Figures 1 to 3, inclusive, we have shown a tractor T having a cab C provided with a roof r. The tractor, as previously noted, may be a separate unit adapted to be coupled to the trailer to be transported thereby, or may be the chassis and associated parts of the truck for supporting and transporting a body mounted thereon. The tractor T is provided with a suitable engine E having belt and pulley driving connection to a fan f disposed adjacent and in the rear of the radiator g, as is known. A refrigerant compressor 5 of suitable known type, is mounted, in a suitable manner, adjacent the engine E, conveniently on the engine block, and is driven from the engine, by a suitable belt and pulley drive connection 6 between the drive shaft of compressor 5 and the shaft of fan f. The intake of compressor 5 is connected by a suitable pipe or conduit 7 to the suction side of the refrigeration system of the unit transported by the tractor, as will be explained more fully later. The discharge of compressor 5 is connected by pipe or conduit 8 to the inlet of the condenser 9, which is of known type, comprising suitably disposed coils with heat radiating vanes or fins mounted thereon. The outlet of the condenser 9 is connected by a pipe or conduit 10 to the inlet of the refrigerant receiver 11, conveniently carried by the tractor T.

In Figure 4 we have shown the tractor T as coupled to a trailer comprising a unit U equipped with a refrigeration system. This system comprises an evaporator 15 having an outlet conduit or pipe 16 connected, by a T 17 and a pipe 18, to the inlet of a refrigerant compressor 19 of known type suitably mounted on the trailer exterior of the body or unit U thereof. The discharge of compressor 19 is connected, by a conduit or pipe 20, to a condenser 21, of known type, the outlet of which is connected, by a conduit or pipe 22, to the inlet of a receiver 23 from the outlet of which extends a conduit or pipe 24. Pipe 24 is connected, by a T 25 and a pipe or conduit 26, to a heat exchanger 27 surrounding pipe 16. The outlet of heat exchanger 27 is connected, by the pipe 28, to an expansion valve 29, of known type, through which the refrigerant is admitted to the evaporator or cooling coil 15. The pipe 18 is provided with a control valve 30 below the T 17, in the upper end of which is secured a nipple 31 having therein a control valve 32. The pipe 24 also is provided with a control valve 33 below the T 25, in the upper end of which is secured a nipple 34 having therein a control valve 35.

When the tractor T is stopped or is uncoupled from the trailer for a considerable period of time, as during an overnight stop or when the trailer is left at its destination, the refrigeration system of unit U is operated for maintaining the desired reduced temperature within that unit. For that purpose, the trailer is provided with an electric motor 38 of known type having driving connection, through a suitable connector 39, to the drive shaft of compressor 19. The motor 38 may be provided with an extension cord or a socket (not shown), by means of which it may be connected to a suitable source of electrical energy at the station or depot at which the stop is made. At such time, the valves 32 and 35 are closed and the refrigerant is circulated through the system in a known manner. As noted, the compressor 19 is disposed exterior of the body or unit U of the trailer, as are the receiver 23 and the motor 38, as well as the condenser 21. A fan 40 is mounted on the shaft of motor 38, adjacent the condenser 21, for causing flow thereover of cooling air in the operation of the refrigeration system, as will be understood. Suitable means, not shown, may be provided for circulating air over the cooling coil or evaporator 15 within unit U for maintaining a substantially uniform temperature therein, as is known.

The outlet of the tractor receiver 11 is connected by a nipple 41 to a T 42 the upper end of which is connected, by a short nipple 43, to a control valve 44. A nipple 45, extending from the upper end of valve 44, has a flexible hose 46, of suitable length, secured on its upper end. Hose 46 is provided, at its other end, with a coupling member 47, of known type, for cooperation with a coupling member 48 secured on one end of a hose 49 the other end of which is secured on the upper end of a nipple 50 extending upward from valve 35. The pipe 7 is provided, at its end remote from compressor 5, with a control valve 52. A nipple 53 extends upward from valve 52 and has one end of a flexible hose 54 secured on its upper end. Hose 54 is provided, at the other end thereof, with a coupling member 55 for cooperation with a coupling member 56 secured on one end of a flexible hose 57 the other end of which is secured on the upper end of nipple 58 extending upward from valve 32. The various control valves so far referred to may be a suitable known type of hand operated valve, and the coupling members 47 and 48 and 55 and 56 may be a suitable known type of coupling members for quickly coupling together and uncoupling the hose lengths 46 and 49 and 54 and 57. A defrosting bypass pipe 60 may be provided, connected at one end, by a T 61, to pipe 8 and at its other end, by a T 62, to nipple 41, pipe 60 being provided, adjacent T 62, with a control valve 63. Also a coiled capillary pipe or tube 65 may be connected at one end to the lower end of T 42, the other end of the pipe 65 being connected by a T 66 to pipe 7, pipe 65 being provided with a control valve 67. The pipe 65 provides a capillary bypass between nipple 41 and pipe 7, when receiver 11 is disconnected from evaporator 15, the valve 67 being then opened.

When the trailer, or the unit U, is being transported by the tractor T, the hose lengths 46 and 49 and 54 and 57 are coupled together, valves 32, 35, 44 and 52 are open, and valves 30, 33, 63 and 67 are closed. With the valves 32, 35, 44 and 52 open, the tractor receiver 11 is connected to pipe 28 and pipe 7 is connected to the outlet of the evaporator or cooling coil 15, that is, to the suction side of the refrigeration system which now includes the tractor carried compressor, condenser and receiver. During transit of the unit U, therefore, the refrigerant is supplied from the receiver 11 to the evaporator 15, from which the vaporized refrigerant is returned to the compressor 5 and, after being compressed, is delivered to the condenser 9, from which the compressed and condensed refrigerant is returned to the receiver 11. In that manner, the refrigerant is circulated through the system for maintaining the desired low temperature within the unit U.

It is of importance that the compressed refrigerant delivered to the condenser 9 be adequately cooled, both to assure maintaining the desired low temperature within the unit U and to assure economical and efficient operation of the refrigeration system. To that end, the condenser 9 is mounted on the roof r of cab C, within a hood 70 suitably secured to the roof of the cab, this hood being open at its front and provided at its back with suitably disposed louvres 71, whereby free flow of air through the hood 70 from front to back thereof is assured. The condenser 9 is suitably mounted within hood 70, at the front thereof, between baffles or partition members 72 secured in hood 70 and extending from front to back thereof. Two electric fans 73, each including a suitable electric motor 74, are mounted in hood 70 in a suitable manner, conveniently by brackets 75 secured to the top of hood 70 and to the partition members 72.

The motors 74 of the fans 73 are respectively connected, at one side thereof, by a lead 76, to one side of a storage battery 77 carried by the tractor T. The other side of the battery 77 is grounded at 78, and the other side of each fan motor 74 is grounded at 79, by a lead 80. The leads 76 of the fan motors have disposed therein a pressure switch 81 of known type. This switch 81 is subject to the pressure of the refrigerant with the conduit or pipe 8, and is opened responsive to a predetermined high pressure of the refrigerant delivered by the compressor 5 to the condenser 9, and closed responsive to a predetermined low pressure of said refrigerant. For example, the switch may be adjusted to close at a pressure of approximately 150 pounds per square inch and to open at a pressure of approximately 140 pounds per square inch. Preferably the fans are disposed adjacent the rearward face of condenser 9 and, when in operation, draw cooling air rearward through and over the condenser 9, the flow of this cooling air being in the same direction as the air stream incident to travel of the tractor T.

During travel of the tractor at its normal speed, on the highway, the air stream flowing over the condenser 9 is ample to assure adequate cooling of the refrigerant supplied thereto by the compressor 5. When the tractor is travelling at relatively low speed, however, as in slow traffic or when ascending steep hills, or is stopped, the flow of air over the condenser 9 due to travel of the tractor may be substantially reduced or completely eliminated. Under such conditions, the refrigerant supplied to the condenser 9 is not adequately cooled and the pressure in the delivery line or pipe 8 rises. When this pressure reaches a predetermined high pressure, approximately 150 pounds, for example, the pressure switch 81 closes and the fans 73 are put into operation. These fans cause flow of cooling air over the condenser 9 at high velocity and in adequate amount to assure sufficient cooling of the refrigerant, so that the pressure in pipe 8 drops, and when this pressure reaches a predetermined low pressure, for example 140 pounds, the switch 81 opens stopping the fans 73. The fans 73 are thus thrown into and out of operation as conditions require, assuring, in conjunction with the travel of the tractor T, that the refrigerant delivered to condenser 9 will be adequately cooled at all times.

As will be understood, the power plant of the tractor T includes the usual engine accessories, including a generator suitably connected to the storage battery 77 for maintaining it properly charged. Since the fans 73 are operated but intermittently and usually for but short periods, with considerable lapse of time therebetween, the drainage of the storage battery 77, due to operation of the fans, is rather slight and is not objectionable.

By mounting the condenser 9 on the roof of the tractor, preferably on the roof of the cab, facing forwardly thereof, unobstructed airflow over the condenser is assured, which is conducive to adequate cooling of the refrigerant and reduces to a minimum the use of the air impeller means or fans for causing flow of cooling air over the condenser. A further advantage of mounting the condenser on the roof of the tractor in the manner stated is that the condenser is not subjected to road dust and mud to an objectionable extent, such as would cause clogging thereof and interfere with free flow of cooling air over the condenser in heat exchange contact with the fins and coils thereof. By disposing and operating the fans 73 in the manner above stated, the air drawn thereby over the condenser 9, in the travel of the tractor, supplements the air stream due to such travel thereby assuring maximum efficiency of the fans in cooperation with the travel of the tractor for cooling the condenser 9 and the refrigerant therein. As above indicated, the condenser 9 may be mounted in any suitable position, though it preferably is mounted on the cab roof of the tractor in view of the advantages attained thereby, above referred to. Further, since the cab of the tractor or truck usually is substantially less in height than the body of the truck or the body of the trailer, mounting the condenser on the cab roof has the further advantage that it does not increase the maximum overall height of the truck or of the tractor-trailer couple, which is of importance with respect to headroom in passing under over passes or through tunnels or like structures.

It will be understood that changes in details may be resorted to without departing from the field and scope of our invention, and we intend to include all such variations, as fall within the scope of the appended claims, in this application in which the preferred form only of our invention has been disclosed.

We claim:

1. In a refrigerator tractor for transporting a unit equipped with a refrigeration system, a condenser carried by said tractor disposed for free flow thereover of the air stream incident to travel of said tractor, a compressor having an intake conduit for connection to the suction side of the refrigeration system and a discharge conduit connected to the inlet of said condenser, the latter having an outlet for connection to a receiver, and means whereby cooling air is caused to flow over said condenser independently of the travel of said tractor responsive to predetermined high pressure in said discharge conduit.

2. In a refrigerator tractor for transporting a unit equipped with a refrigeration system, a condenser and a compressor carried by said tractor with said condenser disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, and means whereby cooling air is caused to flow over said condenser independently of the travel of said tractor responsive to predetermined high pressure of refrigerant delivered by said compressor to said condenser.

3. In a roofed refrigerator tractor for transporting a unit equipped with a refrigeration system, a condenser and a compressor carried by said tractor with said condenser mounted on the tractor roof there disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, and means whereby cooling air is caused to flow over said condenser independently of the travel of said tractor responsive to predetermined high pressure of refrigerant delivered by said compressor to said condenser.

4. In a refrigerator tractor for transporting a unit equipped with a refrigeration system, a condenser and a compressor carried by said tractor with said condenser disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, air impeller means disposed to cause flow of cooling air over said condenser, and means whereby said impeller means is enabled and disabled responsive to predetermined high and low pressures respectively of refrigerant delivered by said compressor to said condenser and independently of the travel of said tractor.

5. In a roofed refrigerator tractor for transporting a unit equipped with a refrigerator system, a hood mounted on the roof of said tractor facing forwardly thereof open at its front and back for free flow of air therethrough, a condenser and a compressor carried by said tractor with said condenser mounted in said hood there disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, fan means driven independently of said tractor disposed adjacent said condenser for causing flow of cooling air thereover, and means for enabling and disabling said fan means responsive to predetermined high and low pressures respectively of refrigerant delivered by said compressor to said condenser.

6. In a roofed refrigerator tractor for transporting a unit equipped with a refrigerator system, a hood mounted on the roof of said tractor facing forwardly thereof open at its front and back for free flow of air therethrough, a condenser and a compressor carried by said tractor with said condenser mounted in said hood there disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, fan means driven independently of said tractor disposed adjacent said condenser for causing flow of cooling air thereover in the direction of flow of the air stream incident to travel of said tractor, and means for enabling and disabling said fan means responsive to predetermined high and low pressures respectively of refrigerant delivered by said compressor to said condenser.

7. In a roofed refrigerator tractor for transporting a unit equipped with a refrigeration system, a hood mounted on the roof of said tractor facing forwardly thereof open at its front and back for free flow of air therethrough, a condenser and a compressor carried by said tractor with said condenser mounted in said hood there disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, fan means driven independently of said tractor disposed in said hood adjacent said condenser for causing flow of cooling air thereover in the direction of flow of the air stream incident to travel of said tractor, and means for enabling and disabling said fan means responsive to predetermined high and low pressures respectively of refrigerant delivered by said compressor to said condenser.

8. In a roofed refrigerator tractor for transporting a unit equipped with a refrigeration system, a hood mounted on the roof of said tractor facing forwardly thereof open at its front and back for free flow of air therethrough, a condenser and a compressor carried by said tractor with said condenser mounted in said hood adjacent the front thereof, said compressor delivering the compressed refrigerant to said condenser and having an intake conduit for connection to the suction side of the refrigeration system, said condenser having an outlet for connection to a receiver, fan means driven independently of said tractor disposed in said hood adjacent and in back of said condenser for causing flow of cooling air thereover in the direction of flow of the air stream incident to travel of said tractor, and means for enabling and disabling said fan means responsive to predetermined high and low pressures respectively of refrigerant delivered by said compressor to said condenser.

9. In a refrigerator tractor for transporting a unit equipped with a refrigeration system, said tractor comprising a roofed cab, a condenser and a compressor carried by said tractor with said condenser mounted on the roof of said cab there disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, and means whereby cooling air is caused to flow over said condenser independently of the travel of said tractor responsive to predetermined high pressure of refrigerant delivered by said compressor to said condenser.

10. In a refrigerator tractor for transporting a unit equipped with a refrigeration system, said tractor comprising a roofed cab, a condenser and a compressor and a receiver carried by said tractor with said condenser mounted on the roof of said cab there disposed for free flow thereover of the air stream incident to travel of said tractor, said compressor delivering the compressed refrigerant to said condenser and having an intake conduit for connection to the suction side of the refrigeration system, said condenser having an outlet connected to said receiver, and means whereby cooling air is caused to flow over said condenser independently of the travel of said tractor responsive to predetermined high pressure of refrigerant delivered by said compressor to said condenser.

11. In a refrigerator tractor for transporting a unit equipped with a refrigeration system, a condenser and a compressor and a receiver carried by said tractor supplementary to the refrigeration system, said condenser being disposed for free flow thereover of the air stream incident to travel of said tractor, said compressor delivering the compressed refrigerant to said condenser and having an intake conduit for connection to the suction side of the refrigeration system, said condenser having an outlet connected to said receiver, and means whereby cooling air is caused to flow over said condenser independently of the travel of said tractor responsive to predetermined high pressure of refrigerant delivered by said compressor to said condenser.

12. In a refrigerator tractor for transporting a unit equipped with a refrigeration system, a storage battery carried by said tractor, a condenser and a compressor and a receiver carried by said tractor supplementary to the refrigeration system, said condenser being disposed for free flow thereover of the air stream incident to travel of said tractor, said compressor delivering the compressed refrigerant to said condenser and having an intake conduit for connection to the suction side of the refrigeration system, said condenser having an outlet connected to said receiver, electric fan means energized by said battery for causing flow of cooling air over said condenser, and a pressure switch controlling the circuit of said fan means effective for closing and opening said circuit responsive to predetermined high and low pressures respectively of the refrigerant delivered from said compressor to said condenser.

13. In a refrigerator tractor for transporting a unit equipped with a refrigeration system, a storage battery carried by said tractor, a condenser and a compressor carried by said tractor supplementary to the refrigeration system, said condenser being disposed for free flow thereover of the air stream incident to travel of said tractor, said compressor delivering the compressed refrigerant to said condenser and having an intake conduit for connection to the suction side of the refrigeration system, said condenser having an outlet for connection to a receiver, electric fan means energized by said battery for causing flow of cooling air over said condenser, and a pressure switch controlling the circuit of said fan means effective for closing and opening said circuit responsive to predetermined high and low pressures respectively of the refrigerant delivered from said compressor to said condenser.

14. In a roofed refrigerator tractor for transporting a unit equipped with a refrigeration system, a condenser mounted on the roof of said tractor there disposed for free flow thereover of the air stream incident to travel of said tractor, a compressor having an intake conduit for connection to the suction side of the refrigeration system and a discharge conduit connected to the inlet of said condenser, the latter having an outlet for connection to a receiver, and means whereby cooling air is caused to flow over said condenser independently of the travel of said tractor responsive to predetermined high pressure in said discharge conduit.

15. In a refrigerator tractor for transporting a unit equipped with a refrigeration system, said tractor comprising a roofed cab, a condenser mounted on the roof of said cab there disposed for free flow thereover of the air stream incident to travel of said tractor, a compressor having an intake conduit for connection to the suction side of the refrigeration system and a discharge conduit connected to the inlet of said condenser, the latter having an outlet for connection to a receiver, and means whereby cooling air is caused to flow over said condenser independently of the travel of said tractor responsive to predetermined high pressure in said discharge conduit.

EDWARD L. MAYO.
ARNSTED G. GETZ.

REFERENCES CITED

The following references are of record in the file of this patent:

UNITED STATES PATENTS

| Number | Name | Date |
| --- | --- | --- |
| 2,115,785 | Peo | May 3, 1936 |